US012699717B2

(12) United States Patent
Pham et al.

(10) Patent No.: US 12,699,717 B2
(45) Date of Patent: Aug. 4, 2026

(54) MULTIAGENT DEBATE

(71) Applicant: Lemon Inc., Grand Cayman (KY)

(72) Inventors: Minh Chau Pham, Los Angeles, CA (US); Boyi Liu, Los Angeles, CA (US); Zhengyu Chen, Los Angeles, CA (US); Yingxiang Yang, Los Angeles, CA (US); Jianbo Yuan, Los Angeles, CA (US); Hongxia Yang, Los Angeles, CA (US); Tianyi Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 260 days.

(21) Appl. No.: 18/497,675

(22) Filed: Oct. 30, 2023

(65) Prior Publication Data

US 2024/0104125 A1 Mar. 28, 2024

Related U.S. Application Data

(60) Provisional application No. 63/584,086, filed on Sep. 20, 2023.

(51) Int. Cl.
*G06F 16/3329* (2025.01)
*G06F 16/334* (2025.01)

(52) U.S. Cl.
CPC ...... *G06F 16/3329* (2019.01); *G06F 16/3344* (2019.01)

(58) Field of Classification Search
None
See application file for complete search history.

(56) References Cited

U.S. PATENT DOCUMENTS

2019/0287012 A1* 9/2019 Celikyilmaz ......... G06F 16/345

FOREIGN PATENT DOCUMENTS

CN 116383026 A 7/2023

OTHER PUBLICATIONS

Du et al., "Improving Factuality and Reasoning in Language Models through Multiagent Debate", May 23, 2023, arXiv:2305.14325v1 , entire document (Year: 2023).*

(Continued)

*Primary Examiner* — Antim G Shah
(74) *Attorney, Agent, or Firm* — Astute IP Law Group

(57) ABSTRACT

There are provided solutions for multiagent debate. In a method, a first and a second response representation are determined by a first and a second agent in a plurality of agents based on a first query representation for a query in a natural language, respectively, and the first and second response representations are convertible to a first and a second answer to the query in the natural language, respectively. A second query representation is obtained based on the first query representation, and at least one of the first and second response representations. A response representation is determined based on the second query representation by at least one of the first and second agents, and the response representation is convertible to an answer to the query in the natural language. These agents communicate in an embedding space without a conversion between a natural language format and an embedding format.

20 Claims, 11 Drawing Sheets

(56) <span style="text-align:center">References Cited</span>

OTHER PUBLICATIONS

Kojima et al., "Large Language Models are Zero-Shot Reasoners", 36th Conference on Neural Information Processing Systems (NeurIPS 2022), Jan. 29, 2023, 42 pages.

Wang et al., "Self-Consistency Improves Chain of Thought Reasoning in Language Models", Published as a conference paper at ICLR 2023, Mar. 7, 2023, 24 pages.

Wei et al., "Chain-of-Thought Prompting Elicits Reasoning in Large Language Models", 36th Conference on Neural Information Processing Systems (NeurIPS 2022), Jan. 10, 2023, 43 pages.

* cited by examiner

200B

200C

200D

300A

301

Question: Jane counts two zebras with 17 stripes each, a zebra with 36 stripes, and another zebra with half that many stripes. How many stripes do the zebras have on average?

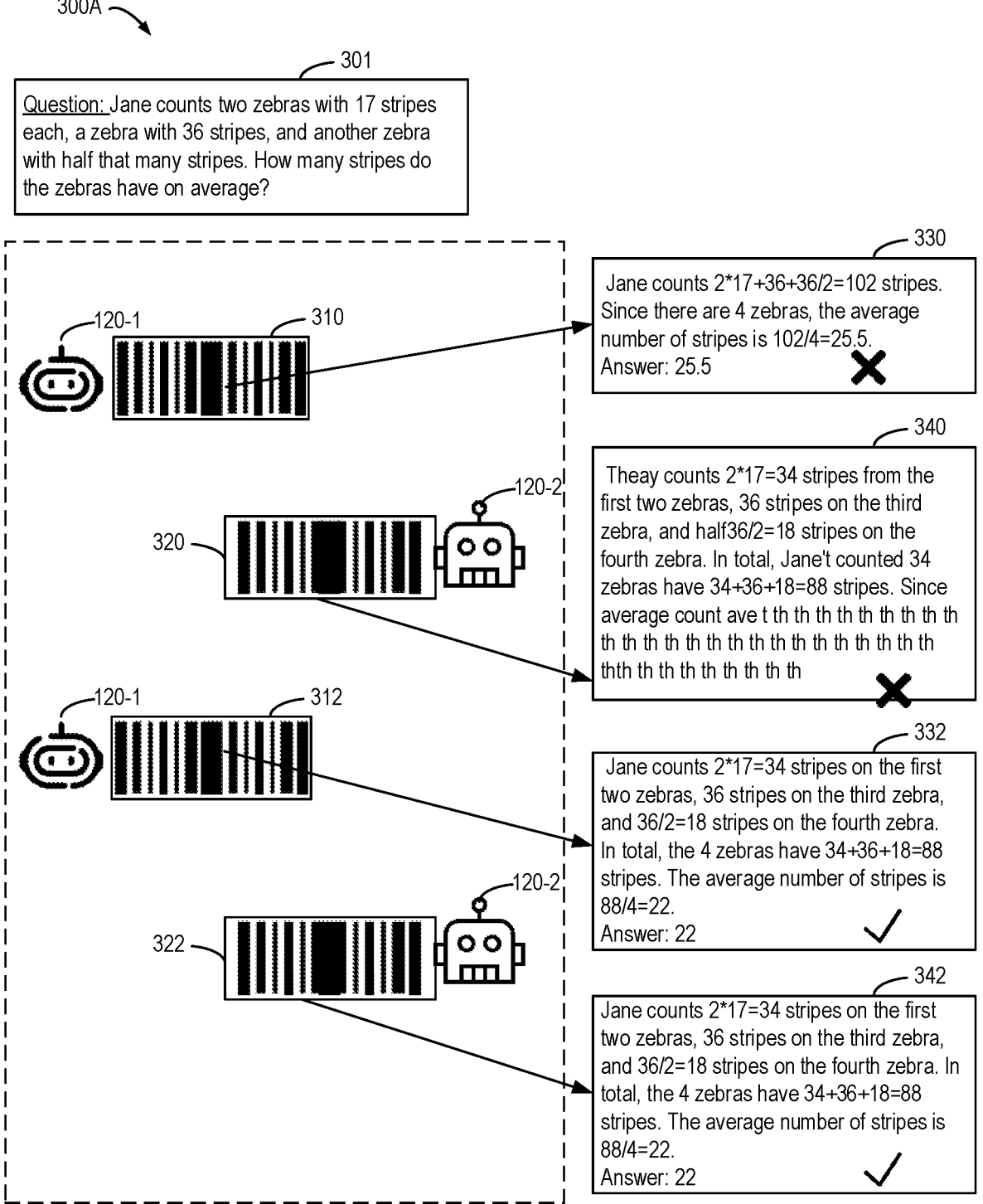

330

Jane counts 2*17+36+36/2=102 stripes. Since there are 4 zebras, the average number of stripes is 102/4=25.5. Answer: 25.5 ✗

340

Theay counts 2*17=34 stripes from the first two zebras, 36 stripes on the third zebra, and half36/2=18 stripes on the fourth zebra. In total, Jane't counted 34 zebras have 34+36+18=88 stripes. Since average count ave t th th th th th th th th th th th th th th th th th th th th th th th th th th th thth th th th th th th th th ✗

332

Jane counts 2*17=34 stripes on the first two zebras, 36 stripes on the third zebra, and 36/2=18 stripes on the fourth zebra. In total, the 4 zebras have 34+36+18=88 stripes. The average number of stripes is 88/4=22. Answer: 22 ✓

342

Jane counts 2*17=34 stripes on the first two zebras, 36 stripes on the third zebra, and 36/2=18 stripes on the fourth zebra. In total, the 4 zebras have 34+36+18=88 stripes. The average number of stripes is 88/4=22. Answer: 22 ✓

Figures 4A, 4B:
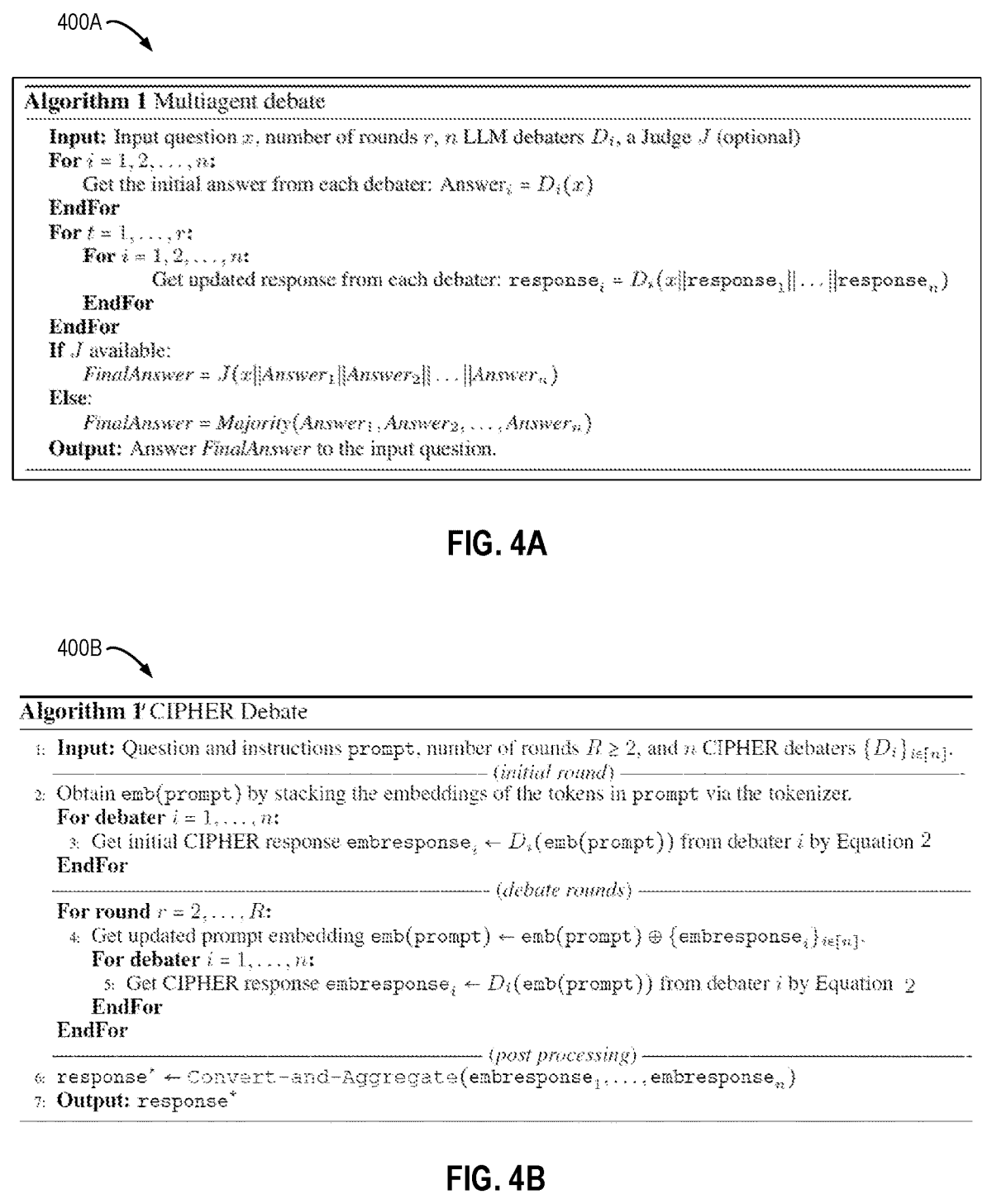

Algorithm 1 Multiagent debate

Input: Input question $x$, number of rounds $r$, $n$ LLM debaters $D_i$, a Judge $J$ (optional)
For $i = 1, 2, \ldots, n$:
    Get the initial answer from each debater: $\text{Answer}_i = D_i(x)$
EndFor
For $t = 1, \ldots, r$:
    For $i = 1, 2, \ldots, n$:
       Get updated response from each debater: $\text{response}_i = D_i(x\|\text{response}_1\|\ldots\|\text{response}_n)$
    EndFor
EndFor
If $J$ available:
    $FinalAnswer = J(x\|Answer_1\|Answer_2\|\ldots\|Answer_n)$
Else:
    $FinalAnswer = Majority(Answer_1, Answer_2, \ldots, Answer_n)$
Output: Answer $FinalAnswer$ to the input question.

Algorithm 1' CIPHER Debate

1: Input: Question and instructions prompt, number of rounds $R \geq 2$, and $n$ CIPHER debaters $\{D_i\}_{i\in[n]}$.
    ———————————————————— (*initial round*) ————————————————————
2: Obtain $\text{emb}(\text{prompt})$ by stacking the embeddings of the tokens in prompt via the tokenizer.
    For debater $i = 1, \ldots, n$:
3:    Get initial CIPHER response $\text{embresponse}_i \leftarrow D_i(\text{emb}(\text{prompt}))$ from debater $i$ by Equation 2
    EndFor
    ———————————————————— (*debate rounds*) ————————————————————
    For round $r = 2, \ldots, R$:
4:    Get updated prompt embedding $\text{emb}(\text{prompt}) \leftarrow \text{emb}(\text{prompt}) \oplus \{\text{embresponse}_i\}_{i\in[n]}$.
      For debater $i = 1, \ldots, n$:
5:      Get CIPHER response $\text{embresponse}_i \leftarrow D_i(\text{emb}(\text{prompt}))$ from debater $i$ by Equation 2
      EndFor
    EndFor
    ———————————————————— (*post processing*) ————————————————————
6: $\text{response}^* \leftarrow \text{Convert-and-Aggregate}(\text{embresponse}_1, \ldots, \text{embresponse}_n)$
7: Output: $\text{response}^*$

510 TABLE

| Model | Method | GSM8K | H.S. Math | Psychology | Formal Logic | Arithmetic |
|---|---|---|---|---|---|---|
| LLaMA2-70B | Single Answer | 59.5 | 38.1 | 71.5 | 46.0 | 75.0 |
| | Major@5 | 65.5 | 41.5 | 74.0 | 44.4 | 77.8 |
| | NLD | 66.5 | 39.6 | 73.0 | 49.2 | 83.0 |
| | CIPHER | 67.5 | 41.5 | 74.0 | 52.4 | 86.5 |
| LLaMA-65B | Single Answer | 50.5 | 33.3 | 66.5 | 43.5 | 29.8 |
| | Major@5 | 57.8 | 36.7 | 67.0 | 46.8 | 31.0 |
| | NLD | 55.5 | 36.7 | 68.5 | 46.0 | 35.0 |
| | CIPHER | 58.8 | 38.5 | 70.5 | 50.8 | 36.5 |

520 TABLE

| (a) Arithmetic | NLD | | | CIPHER | | |
|---|---|---|---|---|---|---|
| | LLaMA2-70B | LLaMA-65B | Agreement | LLaMA2-70B | LLaMA-65B | Agreement |
| Round 1 | 73.0 | 32.5 | 31.5 | 73.5 | 35.0 | 34.5 |
| Round 2 | 69.0(30.0) | 56.0(38.5) | 61.5 | 70.0(27.0) | 61.5(40.0) | 69.0 |
| Round 3 | 72.0(29.5) | 60.5(19.5) | 77.5 | 74.5(13.5) | 62.5(12.0) | 78.0 |

530 TABLE

| (b) GSM8K | NLD | | | CIPHER | | |
|---|---|---|---|---|---|---|
| | LLaMA2-70B | LLaMA-65B | Agreement | LLaMA2-70B | LLaMA-65B | Agreement |
| Round 1 | 61.0 | 51.3 | 51.5 | 61.5 | 48.0 | 44.0 |
| Round 2 | 58.8(32.5) | 57.5(27.3) | 77.5 | 64.3(24.5) | 60.3(39.5) | 70.3 |
| Round 3 | 61.8(14.0) | 59.0(10.5) | 88.8 | 64.8(16.8) | 63.3(12.8) | 83.8 |

FIG. 5

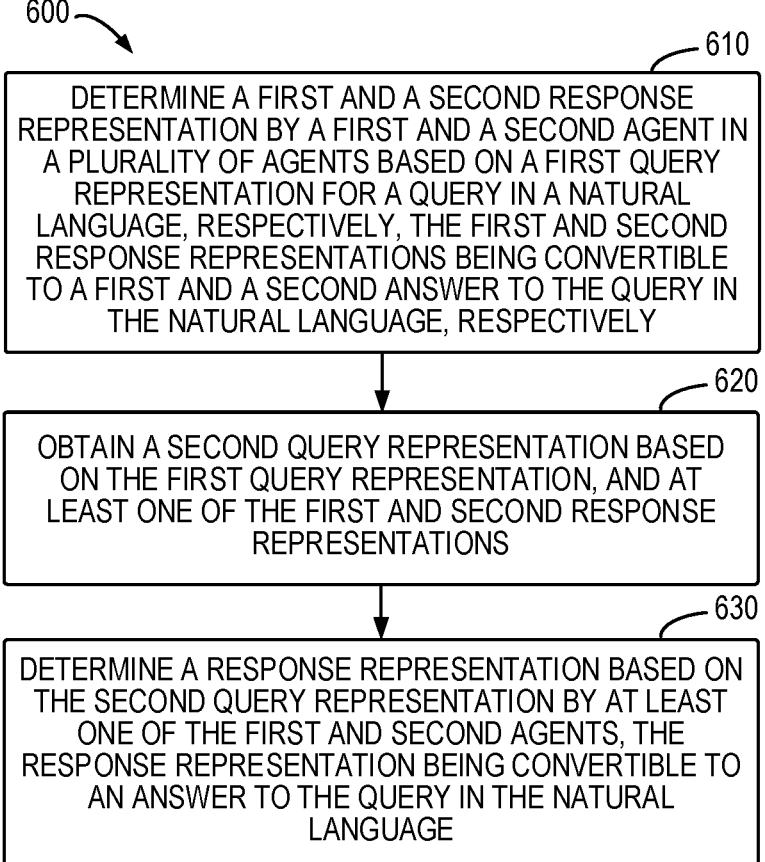

600

610
DETERMINE A FIRST AND A SECOND RESPONSE REPRESENTATION BY A FIRST AND A SECOND AGENT IN A PLURALITY OF AGENTS BASED ON A FIRST QUERY REPRESENTATION FOR A QUERY IN A NATURAL LANGUAGE, RESPECTIVELY, THE FIRST AND SECOND RESPONSE REPRESENTATIONS BEING CONVERTIBLE TO A FIRST AND A SECOND ANSWER TO THE QUERY IN THE NATURAL LANGUAGE, RESPECTIVELY

620
OBTAIN A SECOND QUERY REPRESENTATION BASED ON THE FIRST QUERY REPRESENTATION, AND AT LEAST ONE OF THE FIRST AND SECOND RESPONSE REPRESENTATIONS

630
DETERMINE A RESPONSE REPRESENTATION BASED ON THE SECOND QUERY REPRESENTATION BY AT LEAST ONE OF THE FIRST AND SECOND AGENTS, THE RESPONSE REPRESENTATION BEING CONVERTIBLE TO AN ANSWER TO THE QUERY IN THE NATURAL LANGUAGE

MULTIAGENT DEBATE

CROSS-REFERENCE TO RELATED APPLICATIONS

This application claims the benefit of U.S. Provisional Patent Application No. 63/584,086, entitled MULTIAGENT DEBATE, and filed on Sep. 20, 2023, which is expressly incorporated by reference herein in its entirety.

FIELD

Example implementations of the present disclosure generally relate to the computer science technologies, and in particular to multiagent debate.

BACKGROUND

Conversational platforms allow users to ask questions and then provide answers to the user questions. The users usually input questions in a natural language. Nowadays, the conversational platforms rely on models, such as machine learning models, to perform reasoning tasks on the user questions and provide responses in the natural language. There are a variety of works that strengthen the reasoning ability of the models, so as to improve the accuracy of the generated responses.

SUMMARY

According to implementations of the subject matter described herein, a solution is provided for multiagent debate. In this solution, a first and a second response representation are determined by a first and a second agent in a plurality of agents based on a first query representation for a query in a natural language, respectively, and the first and second response representations are convertible to a first and a second answer to the query in the natural language, respectively. A second query representation is obtained based on the first query representation, and at least one of the first and second response representations. A response representation is determined based on the second query representation by at least one of the first and second agents, and the response representation is convertible to an answer to the query in the natural language.

The Summary is provided to introduce a selection of concepts in a simplified form that are further described below in the Detailed Description. The Summary is neither intended to identify key features or essential features of the subject matter described herein, nor is it intended to be used to limit the scope of the subject matter described herein.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where:

FIG. 3A illustrates an example of multiagent debate via embeddings in accordance with some example implementations of the present disclosure;

FIG. 4A illustrates an example algorithm for multiagent debate via embeddings in accordance with some example implementations of the present disclosure;

FIG. 4B illustrates an example algorithm for multiagent debate via embeddings in accordance with some example implementations of the present disclosure;

FIG. 5 illustrates experiment results with respect to the proposed solution in accordance with some example implementations of the present disclosure;

FIG. 6 illustrates a flowchart of a method for multiagent debate in accordance with some example implementations of the present disclosure.

DETAILED DESCRIPTION

Figure 1:
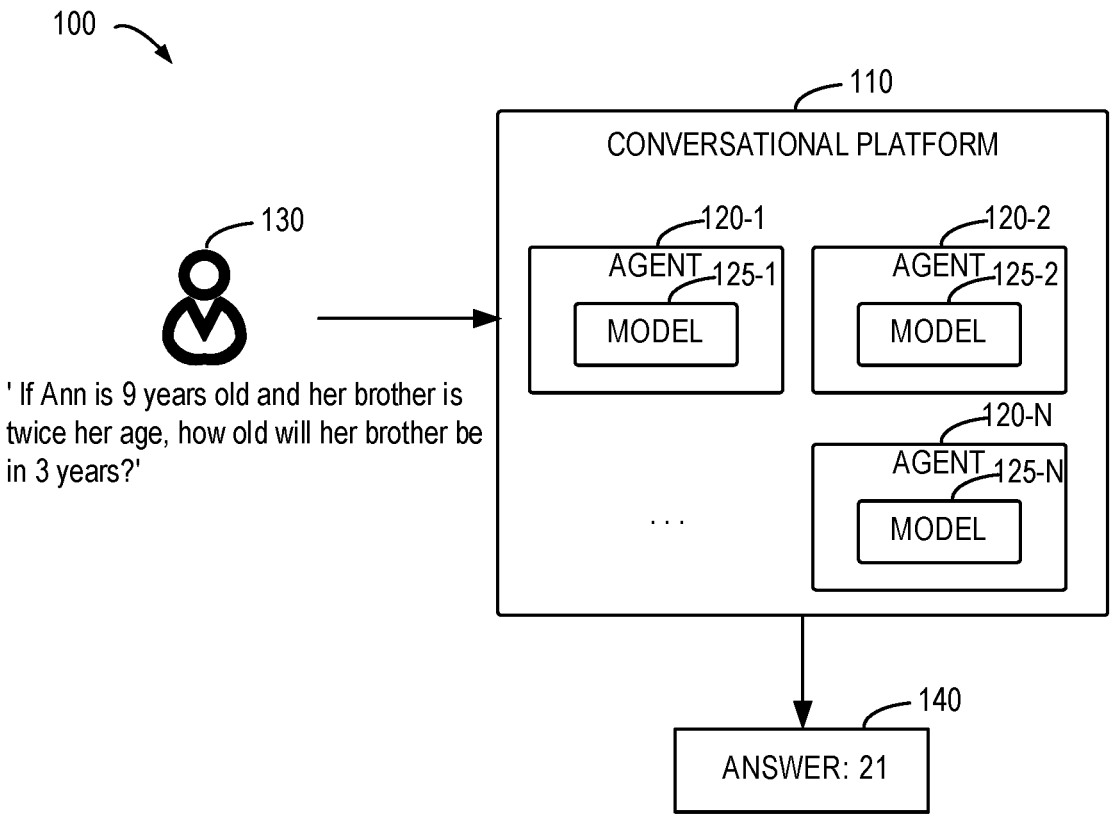
FIG. 1 illustrates a block diagram of an example environment in which various implementations of the present disclosure may be implemented.

Principle of the present disclosure will now be described with reference to some implementations. It is to be understood that these implementations are described only for purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for purpose of describing particular implementations only and is not intended to be limiting example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "model" is referred to as an association between an input and an output learned from training data, and thus a corresponding output may be generated for a given input after the training. The generation of the model may be based on a machine learning technique. In general, a machine learning model may be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model may obtain, from the training data, consistent inference similar to those that human intelligence may make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model may provide a correct output, so as to determine the performance of the model. Generally, the validation stage may be considered as a step in a training process, or sometimes may be omitted. At the application stage, the resulting machine learning model may be used to procedure a real-world model input based on the set of parameter values obtained from the training procedure and to determine the corresponding model output.

FIG. 1 illustrates a block diagram of an example environment 100 in which various implementations of the present disclosure may be implemented. In the environment 100 of FIG. 1, a conversational platform 110 may receive a question from a user 130. The question may be provided in a natural language (for example, in English, Chinese, or another natural language), e.g., "If Ann is 9 years old and her brother is twice her age, how old will her brother be in 3 years?" The conversational platform 110 includes one or more agents 120-1, 120-2, . . . , 120-N (collectively or individually referred to as agents 120, where N indicates an integer larger than or equal to one) to process the question from the user 130 and provides a final answer 140 to the question, e.g., "Answer: 21."

The agents 120-1, 120-2, . . . , 120-N are configured to use machine learning models 125-1, 125-2, . . . , 125-N (collectively or individually referred to as machine learning models 125 or models 125 for short), respectively, to process the natural language question. In some implementations, the models 125 may be language models, which are trained on large-scale corpus to learn the capability of understanding one or more types of natural languages. In some implementations, the models 125 may be generative models for content generation. The models 125 may be constructed based on various machine learning technologies, for example, the models 125 may be implemented based on Large Language Models (LLMs).

There have been proposed various ways to improve the reasoning ability of machine learning models, especially language models. One way is to improve the reasoning ability in language models via prompting. There are a variety of works that strengthen the reasoning ability of models using in-context learning. In one solution, it is proposed to employ a series of intermediate reasoning steps to enhance the ability of large language models on complex reasoning tasks. Another solution generalizes this idea to explore multiple different intermediate steps for the best reasoning path using looking ahead and backtracking when necessary. These techniques, along with few-shot examples, enable language models to boost their performance on a variety tasks.

A further way is self-improvement of the language models via feedback. Inspired from the observation that humans iteratively refine their initial answers to have a better version, there are a wide range of work try to apply this concept into language models. In a solution, it is proposed to employ a language model to act as generator and critic roles. First, the model generates an initial output, then the same model provides feedback to itself and then have a refined version. It shows that with specific feedback, powerful models may boost their performance. However, this strategy does not work for less competent models (for example, with less parameters) as it was discovered that it struggled to consistently generate the feedback in the required format. In the same line of work, another solution leverages verbal reinforcement to instruct agents in learning from their previous errors. In other work, those solutions focused on improving coding ability of language models by letting them to self-debug using explanation and the generated code in natural language, along with execution results from unit tests. It is revealed that a good setup is to utilize different model for each role, specifically, a better critic than the generator gives feedback to a less powerful model, or humans give feedback to the well-trained model. In addition, compared to majority vote, self-repair on weaker models cannot gain improvement.

Recently, multiagent debate is provided to improve initial outputs from language models through interaction. It involves language models providing initial direct responses, followed by the opportunity for these models to examine and incorporate the answers of other models to refine their beliefs. This solution encourages divergent thinking in language models and removes the bottleneck at giving feedback. Previous works show that this method outperforms self-refine on a variety of datasets. However, these works employed powerful agents for debating purposes. Thus, whether open-source models, which are less powerful and competent, could also benefit from engaging in debates is unclear.

In the multiagent debate solution, multiple agents (for example, implemented by LLMs) provide initial responses, and then make refinements by iteratively considering data from peers. Typically, the LLMs reach a consensus in a few debate rounds that is often more accurate. Further, a "judge" may be incorporated to resolve tiebreakers and determine the final answer. While closely related to the self-improvement via feedback solution where a model iteratively refines its own responses, this debate solution involves multiple agents with the same role. This solution not only encourages divergent thinking in LLMs, but also eliminates the bottleneck at the feedback step, evidencing superior performance compared to self-improvement via feedback methods across diverse datasets.

Discussion and debate among models have recently seen blooming interest. However, the communications in existing studies are all conducted in natural languages, raising interests in questioning their necessity and efficiency. The recent surge in research on discussion and debate among models has demonstrated tremendous potentials for the language models to engage in collaborative communication. Similar to human decision-making process when opinions diverge, language models may also utilize discussion and debate for refinement of their responses. A line of recent solutions delved into adapting this form of social behaviors to language models. In particular, it has been demonstrated that debate may significantly benefit the quality of the generated responses, provided that at least one of the participating models is a powerful language model.

Notably, it is also found that the effectiveness of self-repair is uniquely seen in a language model in code generation tasks. Similarly, it has been tested the ability of language models in a bargaining game setup and discovered that only strong and well-aligned models may continuously improve their responses through feedback. These findings collectively suggest that the current communication protocol may be insufficient for less powerful models to effectively benefit from feedback. Thus, the benefits of discussion and debate across models of other sizes and architectures remain to be fully revealed.

One potential factor that may limit the efficacy of debates among language models could be the reliance on natural language for communication. While this is somewhat unavoidable as language models are trained to understand and generate natural language. Specifically, the natural language generation procedure requires sampling tokens from a distribution over the entire vocabulary table, which may introduce a risk of information loss. Such information loss is corroborated from empirical investigations. It may be illustrated with a few examples below.

Referring to FIGS. 2A-2D to more details about multi-agent debate, where FIGS. 2A-2D illustrate examples of conventional model debate. In an example, in reasoning tasks, the most confident token selected by the model might be wrong. As illustrated in an example 200A of the conventional model debate in FIG. 2A, the agent 202 may receive a question 201 and provide an answer 210. While performing reasoning on an arithmetic question 201, the most confident token ("6") is wrong, while the correct token ("5") has the second-highest probability. It is thus beneficial to consider the top k tokens with k≥2.

Figure 2A:
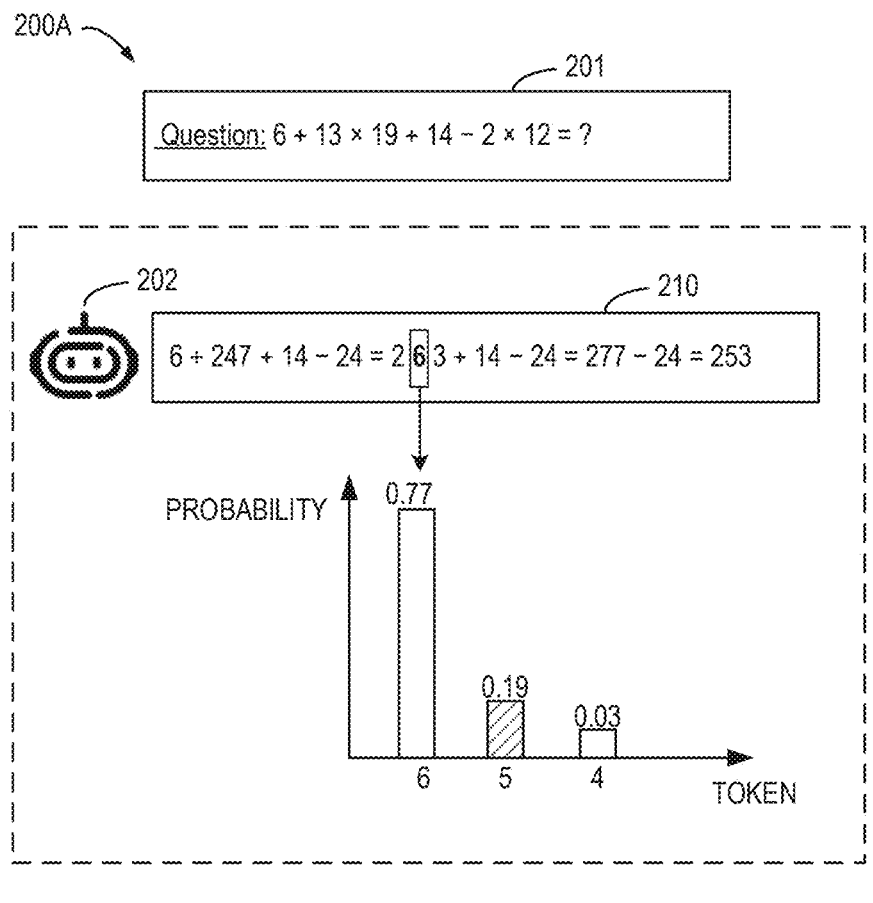
FIGS. 2A-2D illustrate examples of conventional model debate.
Figure 2B:
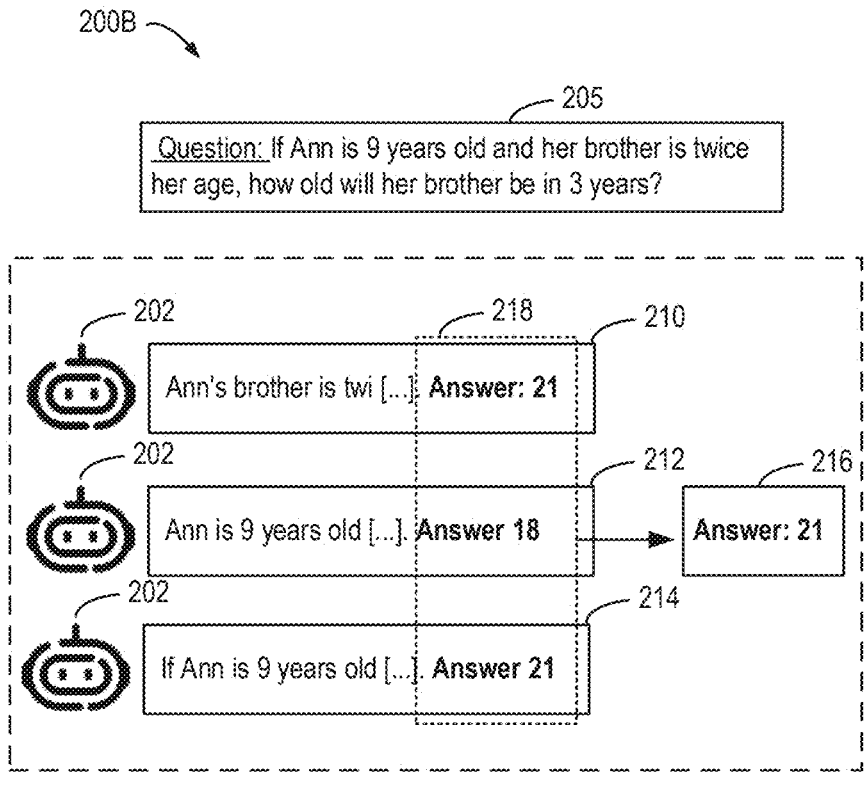
Figure 2C:
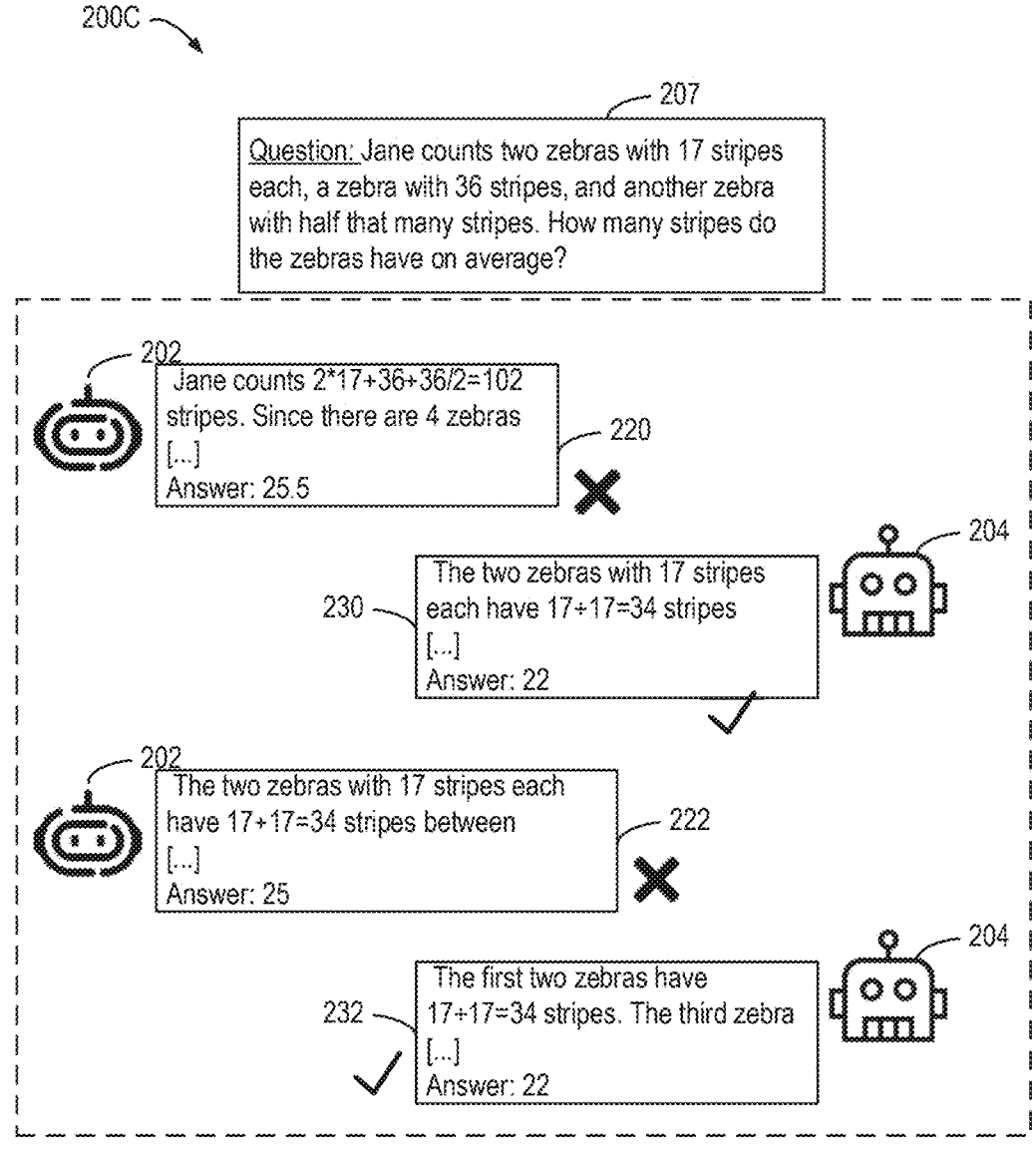

FIG. 2B provides another example 200B, the agents 202 provide various candidate answers 210, 212, 214 to the question 205 which are achieved by leveraging various token sequences. The response correction 218 is performed based on majority voting, to determine the final answer 216. It indicates that a greedy approach to token selection might not be optimal.

Previous works on multiagent debate solely use natural language for inter-model communication. As illustrated in an example 200C in FIG. 2C, regarding a natural language question 207, in a first round of debate, an agent 202 generates an initial answer 220 in a natural language to the question 207, and an agent 204 generates an initial answer 230 in the natural language to the question 207. In a second round of debate, the agent 202 generates an updated answer 222 after considering the initial answer 230 in the natural language from the agent 204. Similarly, in the second round of debate, the agent 204 generates an updated answer 232 after considering the initial answer 220 in the natural language from the agent 202. The agents propose and debate their individual responses and reasoning processes over multiple rounds to arrive at a common final answer to the question 207.

Figure 2D:
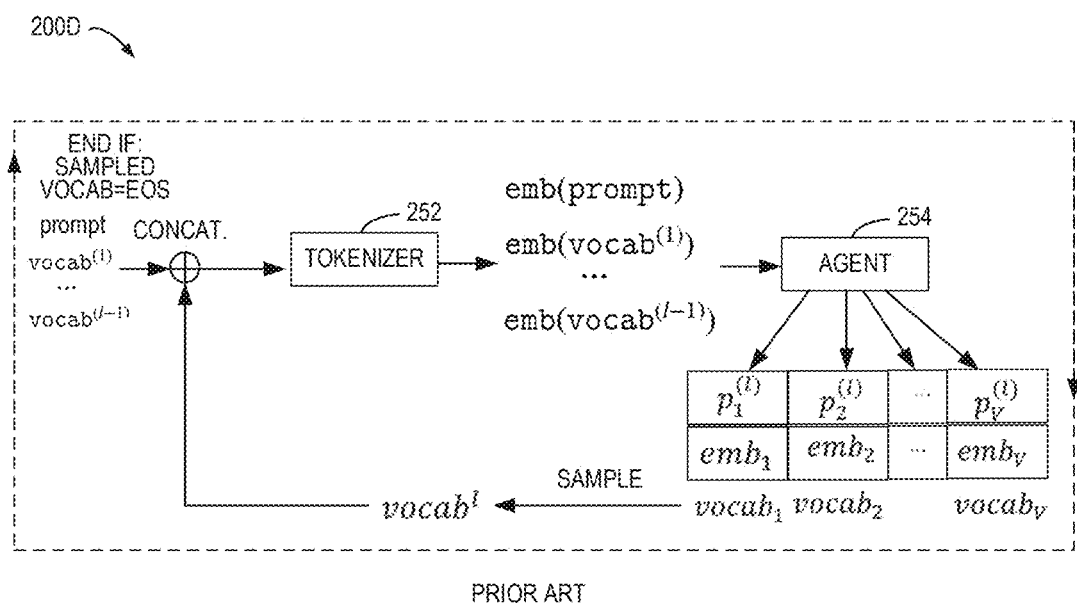

FIG. 2D illustrates schematic architecture 200D for conventional model debate over the natural language. For an input in the natural language, a tokenizer 252 is utilized to convert the prompt (in the natural language) into embedding(s). First, an initial input includes a prompt "prompt" based on an answer from the user. Then the input is updated after debating with other agents, e.g., by considering answers from other agents, $vocab^{(1)}, \ldots vocab^{(I-1)}$. The embedding outputs from the tokenizer 252 include emb (prompt), $emb(vocab^{(1)})$, . . . , $emb(vocab^{(I)})$, which are inputted into the agent 254, as a model input. The agent 254 provides probabilities of various embeddings (V embeddings corresponding to multiple vocabularies defined in a vocabulary table adopted by the agents), which are converted to corresponding natural language vocabularies, $vocab_1$, $vocab_2$ . . . , $vocab_V$. Then a natural language vocabulary $vocab^I$ is sampled from the V natural language vocabularies and is concatenated with the previous natural language input for tokenizing. This procedure iterates until a final answer is obtained.

As discussed above, the outputs from the multiagent debate procedure are implemented in the natural language format. Information loss may be observed due to the sampling procedure for natural language response generation naturally raises the following question: whether language models communicate more efficiently if the debate is not confined to natural language.

In implementations of the present disclosure, there is proposed a communication solution named CIPHER (Communicative Inter-Model Protocol Through Embedding Representation). Instead of using natural language for inter-model communications, it is proposed an embedding communication protocol in a multiagent debate procedure, which addresses potential suboptimality caused by information loss when sampling natural language tokens. Specifically, the token sampling procedure is eliminated from the multiagent debates, and make the agents to communicate their beliefs across the entire vocabulary table through the expectation of the raw transformer output embeddings.

Generally, a plurality of agents may join the debate, and the plurality of agent may comprise at least a first and a second agent. Initially, a query (for example, the question) in a natural language may be received and then the query may be converted into a first query representation. Here, the term "representation" may be a feature (for example, embedding) of the query and is determined according to a tokenizer related to a vocabulary table defined for the natural language. In a context of the present disclosure, "representation" is defined in a vector format (for example, embedding) that is understood by the models but has an invisible format to the outside human users. Therefore, the debate procedure is implemented in the embedding space within the conversational platform 110.

In an initial round of the debate, a first and a second response representation may be determined by the first and second agents in a plurality of agents based on a first query representation. Here, the first and second response representations are convertible to a first and a second answer to the query in the natural language, respectively. Then, a second query representation may be obtained based on the first query representation, and at least one of the first and second response representations. Further, a response representation may be determined based on the second query representation by at least one of the first and second agents, and here the response representation is convertible to an answer to the query in the natural language.

With the proposed solution, even without any modifications to the models (for example, weights of the model), the communicated contents among the models deviate from natural languages, allowing for a more robust inter-model belief information transfer, especially when the models are less certain about their sampled outputs. Through extensive experimentation, it has shown that discussion and debate among open-sourced models consistently benefit from this novel change of communication protocol compared to its natural-language counterpart across a wide variety of reasoning tasks. Some example implementations of the present disclosure will be described in detail below with reference to the accompanying figures.

Referring to FIG. 3A to a detailed example, where FIG. 3A illustrates a schematic example of multiagent debate via embeddings in accordance with some example implementations of the present disclosure. In implementations of the present disclosure, a multiagent debate setup is employed. However, in contrast to previous works, a novel form of communication is introduced in which agents may interact without using natural language. The models (or agents) are enabled to directly output embedding vectors and use the embedding vectors from other models as the inputs during debates. Although designed for inter-model communication, it is possible to peek into the conversations by converting them back into natural language through nearest neighbor search.

As illustrated in FIG. 3A, regarding a question 301 (also referred to as a query) in the natural language, an agent 120-1 generates an initial response embedding 310, which is convertible into a natural language response (also referred to as an answer) 330, and an agent 120-2 also generates an initial response embedding 320, which is convertible into a natural language response 340. The response embeddings 310, 320 are in form of raw vectors, to avoid information loss from the token sampling procedure. The agent 120-1 further takes the initial response embedding 320 from the agent 120-2 as its input, as well as other response embeddings from other agents involved in the multiagent debate procedure (if available). For example, the initial response embedding 320 may be concatenated with the question embedding. Similarly, the agent 120-2 further takes the initial response embedding 310 from the agent 120-1 as its input, as well as other response embeddings from other agents (if available). In this round (i.e., the first round) of debate, the agent 120-1 may generate a new response embedding 312 to the question 301, which is convertible into a natural language response 332. The agent 120-2 may also generate a new response embedding 314 for the question 301, which is convertible into a natural language response 342.

The debate may be performed for more than one round until a final response embedding is obtained among the agents. It would be appreciated that although only two agents are illustrated in FIG. 3A, there may be more than two agents involved in the multiagent debate procedure, and the number of agents may be determined depending on actual applications.

In the implementations of the present disclosure, it has been affirmatively determined that models or agents may communicate more efficiently if the models or agents are not confined to natural language and but may communicate within the tokenizer's embedding space in multiagent debate setting. Such a novel communication solution bypasses the sampling procedure from the vocabulary set, thereby retains richer information from less confident vocabularies. While such a form of communication deviates from natural language, it remains interpretable to human via nearest neighbor search in the vocabulary.

Through implementations of the present disclosure, models or agents may effectively communicate without relying on natural language and then achieve superior results. Experiments are implemented on different datasets across multiple domains, and it shows significant performance improvement over the natural-language counterpart. Further, the experiment results align with the previous observations that, compared to majority voting solutions, weaker models do not benefit from debate or self-refine when communicating through natural language. The experiments also show that communication in the embedding space may facilitate more efficient information transfer among models, which benefit the multiagent debate even for less powerful models. This suggests that, even for smaller open-source models, debate is still an efficient form of communication to increase the performance of models.

In the implementations of the present disclosure, the plurality of agents share the same vocabulary table for the natural language and the same tokenizer. Here, the tokenizer describes an association relationship between a vocabulary in a plurality of vocabularies that are defined in the vocabulary table and a vocabulary representation for the vocabulary. With these implementations of the present disclosure, the conversion between the vocabulary and the representation for the vocabulary may be managed in a uniform way and thus the complexity for the conversion may be reduced.

In the implementations of the present disclosure, the LLMs may take a prompt (such as a query) as input and autoregressively generate a sequence of tokens according to the tokenizer as the response. For the tokenizer, a vocabulary set $\mathcal{V}=\{vocab_i\}_{i \in [V]}$ with its corresponding embedding set $\{emb_i\}_{i \in [V]} \subset \mathbb{R}^{d_{emb}}$ are defined, where [V] $\{1, \ldots, V\}$ indicates an index set. Further, prompt may indicate the prompt that is to be inputted into the LLMs, and response$^{(l-1)}$ may indicate the first l−1 vocabularies that are generated previously in the response. Here, the prompt may include the question (for example, in the initial round), alternatively and/or in addition, the prompt may also include the instruction, question, and (possible) responses (for example, in the debate round(s)). At the final layer, a logit vector logit$^{(l-1)} \in \mathbb{R}^{1 \times V}$ is computed, and then transformed into a probability distribution over the vocabulary using the Softmax function.

Figure 3B:
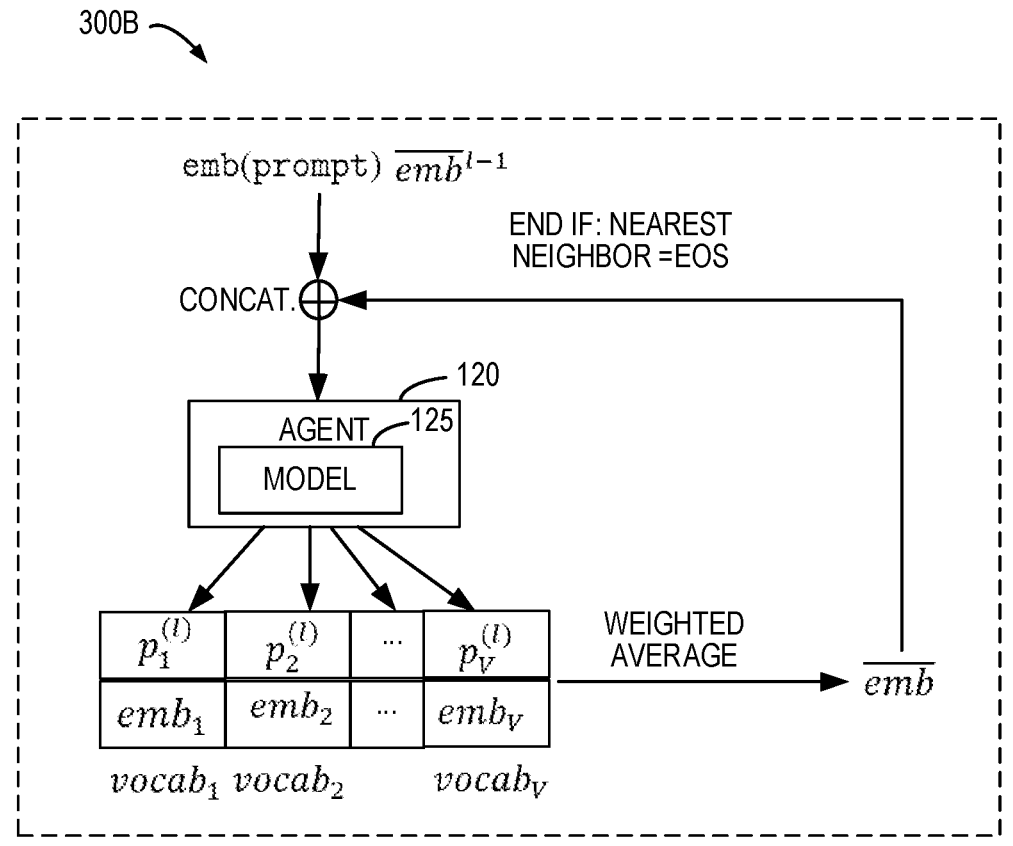
FIG. 3B illustrates a block diagram of architecture for multiagent debate via embeddings in accordance with some example implementations of the present disclosure.

Referring to FIG. 3B for more details about the embedding communication protocol for debate among models. FIG. 3B illustrates a block diagram of architecture 300B for multiagent debate via embeddings in accordance with some example implementations of the present disclosure. This architecture 300B shows an iterative procedure of the multiagent debate at one of the plurality of agents.

In FIG. 3B, when generating a response, an agent 120 or the model 125 (e.g., a causal language model) autoregressively generates a token, for example, one at a time based on the words that come before each token. In a tokenizer, a vocabulary set $\mathcal{V}$ with its corresponding embedding set $\{emb_i\}_{i \in [V]} \subset \mathbb{R}^{d_{emb}}$ are defined. Starting from the top of FIG. 3B, the tokenizer encodes the prompt and response$^{(l-1)}$ into embedding inputs for the agent. The agent then outputs a distribution $$p^{(l)} = \left( p_1^{(l)}, \ldots, p_V^{(l)} \right)$$

over $\mathcal{V}$, from which the next token $vocab^{(l)}$ is sampled (bottom mid). In the implementations of CIPHER, instead of producing a single token $vocab^{(l)}$, CIPHER generates an average embedding vector $\overline{emb}$ utilizing $p^{(l)}$ as weights. Such an embedding vector bypasses the token decoding step and is fed directly back into the agent. Note that CIPHER-generated embedding vectors usually approximate but do not precisely match a token embedding. Here, $p^{(l)}$ meets the following Equation 1:

$$p^{(l)} = \left[ p\left(vocab_1 \mid prompt, response^{(l-1)}\right), \ldots , \right. \qquad \text{Equation 1(l)}$$
$$\left. p\left(vocab_V \mid prompt, response^{(l-1)}\right) \right]$$
$$= \text{softmax}\left(\frac{logit^{(l-1)}}{T}\right) \in \mathbb{R}^{1 \times V}$$

In the above Equation 1, where $T \to 0$ refers to the temperature. It is noted that when $T \to 0$, sampling degenerates to argmax token generation. The distribution $p^{(l)}$ can be viewed as the agent's belief regarding the most appropriate token at the current position. However, the token sampling step compresses the information of $p^{(l)}$ into a single token, discarding the information on all other tokens in the process. Although presenting exactly one realized vocabulary at each position is useful for humans to understand the outputs from agents, it is not a requirement for effective inter-agent communication. Here, the rich information contained in the agent's belief may be represented by the probability distribution over all tokens. Thus, the token sampling process, which trades off information for readability, may lead to a sub-optimal solution for inter-agent communication.

In implementations of the present disclosure, to capitalize the rich information encoded in the model's belief, it is proposed to allow the models 125 to communicate in the form of embeddings during debates. With the embedding representations of the responses (referred to as "response embeddings") from multiple models 125 (also referred to as debaters) collected, the response embeddings are feed into the debating procedure. To start the debate, the question and (possibly) the instructions are converted into the embeddings emb(prompt) (referred to as "query representation") using the tokenizer. Then, for the debating rounds, the multiple agents 120 (i.e., the model debaters) intake the embedded question, instruction, and (potentially) responses from the previous rounds to generate their embedding responses.

FIG. 4 illustrates an example algorithm 400 for multi-agent debate via embeddings in accordance with some example implementations of the present disclosure. In FIG. 4, there is provided an embedding communication protocol for debates among LLMs, to capitalize the rich information encoded in the belief Ideally, it is desired to encode as much belief information as possible during inter-LLM communication. However, given that LLMs are designed to understand natural language sequences, they might not be able to grasp vectors that reside outside the tokenizer's embedding space. Thus, the weighted average of embeddings is used in place of the tokens sampled with respect to $p^{(l)}$ in the autoregressive response generation process. Formally, emb (prompt) is donated as the concatenations of word embeddings of prompt. Starting from an empty response embedding $\overline{emb}^{(0)}$, the CIPHER embedding generation procedure is autoregressively defined as:

$$\overline{emb}^{(l)} = concat\left[ \overline{emb}^{(l-1)}; \right. \qquad \text{Equation 2}$$
$$\left. \sum_{i=1}^{V} p\left(vocab_i \mid emb(prompt), \overline{emb}^{(l-1)}\right) \cdot emb_i \right] \in \mathbb{R}^{l \times d_{emb}}$$

In the above equation, the embedding generation procedure for the model 125 continues until either (i) the maximal sequence length is reached, or (ii) the EOS (End Of Sentence) token embedding becomes the nearest neighbor of the newly generated embedding.

Referring to FIG. 4A for a general procedure of the proposed multiagent debate, FIG. 4A illustrates an example algorithm for multiagent debate 400A via embeddings in accordance with some example implementations of the present disclosure. As shown, the input may comprise the input question x, the number r of the rounds, the number n of the LLM debaters $D_i$(i.e., the agent, where i indicates an integer), and a Judge J (optional). In the initial round of the multiagent debate, an initial answer may be obtained from each debater $D_i$. In the next one or more debate rounds, updated response may be obtained from each debater. Optionally, if there is a judge, then the final answer may be decided by the judge; otherwise, the final answer may be determined by a majority function for the answers outputted from the multiple debaters. Compared with the conversional solution where $Answer_i$ is in represented in a form of the natural language, in the proposed Algorithm 1, vector embeddings are used to the communication in embedding space. In other words, all the communications between the multiple debaters are in the embedding format and are invisible to the outside users.

Further, the multiagent debate procedure may be detailed in Algorithm 1'. Referring to FIG. 4B for more details, FIG. 4B illustrates an example algorithm for multiagent debate 400B via embeddings in accordance with some example implementations of the present disclosure. As shown in FIG. 4B, prompt may include the question and the instructions, the number of the debate rounds is represented by R>2, and there are n CIPHER debaters $\{D_i\}_{i \in [n]}$. Further, the question and instructions are converted into embeddings emb (prompt) using the tokenizer (Line 2). Then, for each debate round r, an embedding is generated by stacking (denoted as $\oplus$) emb(prompt) and (possible) the CIPHER responses from all debaters in previous rounds r−1 (Line 4). Such an embedding is then inputted directly into the debaters without the token decoding step (i.e., the debaters use the embeddings during the further debate). The debaters then generate refined CIPHER responses following Equation 2 to finish this round r (Line 5). To close the debate, the embedding responses may be converted back to natural language using nearest neighbor search and aggregate them (denoted as Convert-and-Aggregate) to obtain the final response according to the tokenizer (Line 6).

The idea of CIPHER is similar to that of Expected SARSA in the reinforcement learning. For causal LLMs, the autoregressive token generation procedure can be viewed as a Markov decision procedure where, at the timestep l, the state is the previously generated response $response^{(l)}$, the action space is the vocabulary set $\mathcal{V}$, the policy is $p^{(l)}$ defined in Equation 1, and the reward is tied to the response's accuracy. To this end, the weighted averaging of embeddings shares the same spirit as Expected SARSA, computing expectations over possible tokens. Meanwhile, the natural language response generation procedure, where tokens are probabilistically sampled, aligns with vanilla SARSA.

In implementations of the present disclosure, the response representation may correspond to an answer that comprises a previous portion including at least one vocabulary and a current vocabulary that follows the previous portion, and the at least one vocabulary and the current vocabulary are included in a vocabulary table shared among the plurality of agents. At this point, the response representation may comprise multiple vocabulary representations corresponding to the multiple vocabularies, respectively. Taking the response representation (indicated as embresponse$_i$) as an example, the response representation may be determined by an agent based on the first query representation. Specifically, a current representation is obtained for the current vocabulary by the first agent based on the first query representation and a previous representation for the previous portion. Then, the first response representation may be determined based on the previous representation and the current representation.

Referring to the initial round in FIG. 4B, embresponse$_i$ is determined by debater D$_i$ according to Equation 2, where the representation for the previous portion corresponds to $\overline{emb}^{(l-1)}$, and the representation for the current vocabulary corresponds to emb$_i$, and then the response representation may be determined iteratively. For example, in determining the first vocabulary, the previous portion is NULL, and the representation for the first vocabulary is determined according to a simplified version of Equation 2, where data related to (1–1) is set to NULL in Equation 2. Further, the representation for the second vocabulary and the subsequent vocabularies may be determined based on Equation 2 in an iterative way. With these implementations, all representations for all the vocabularies in the answer may be determined in an iterative way according to the above equations, and thus the complex procedure is converted into simple mathematical operations.

In implementations of the present disclosure, in order to obtain the current representation, a distribution may be determined first. Here the distribution is related to a plurality of vocabulary representations respectively corresponding to a plurality of vocabularies that are defined in a vocabulary table shared among the plurality of agents. Then, the current representation may be determined by weighting the plurality of vocabulary representations according to the distribution. Referring to Equation 2, $$\sum\nolimits_{i=1}^{V} p\left(\text{vocab}_i \middle| emb(\text{prompt}), \overline{emb}^{(l-1)}\right)$$

corresponds to the weight and then the current representation may be determined as $$\sum\nolimits_{i=1}^{V} p\left(\text{vocab}_i \middle| emb(\text{prompt}), \overline{emb}^{(l-1)}\right) \cdot emb_i.$$

As shown in Line 3 in FIG. 4B, all the debaters may output the initial answer CIPHER response embresponse$_i$ in a similar way, and thus there may be n response representations after the initial round.

In implementations of the present disclosure, in the subsequent debate rounds, the first query representation may be updated to a second query representation. For example, the second query representation may be determined based on the first query representation, and at least one of the first and second response representations. In order to obtain the second query representation, the first query representation and at least one of the first and second response representations may be combined to form the second query representation. Specifically, in Line 4 of FIG. 4B, the updated prompt embedding corresponds to the second query representation when r=1. At this point, the first query representation (indicated by emb(prompt) and any of the first and second response representations (indicated by {embresponse$_i$}$_{i\in[n]}$ may be concatenated.

In implementations of the present disclosure, in each of the debate rounds, the response representation may be determined based on the above Equation 2. For example, a third response representation may be determined by the first agent based on the second query representation. Alternatively and/or in addition, a fourth response representation may be determined by the second agent based on the second query representation, the third and fourth response representations being convertible to an answer to the query in the natural language. Further, the response representation may be selected from the third and fourth response representations, for generating an answer to the query in the natural language. With these implementations, all the communications are implemented in the embedding space without the information loss caused by the tokenizer. Therefore, performance of the CIPHER debate is much higher than the common multiagent debate via the natural language.

In implementations of the present disclosure, the response representation may be selected in various ways. For example, the response representation may be selected from the third and fourth response representations in a random way. Alternatively and/or in addition to, the response representation may be selected from the third and fourth response representations based on respective distributions related to respective vocabularies that are determined according to the third and fourth response representations. Here, the respective vocabularies are included in a vocabulary table shared among the plurality of agents. Specifically, as shown in Equation 1, a logit vector logit$^{(l-1)} \in \mathbb{R}^{1\times V}$ is computed at the final layer of the conversational platform 110, and then transformed into a probability distribution over the vocabulary using the Softmax function. With these implementations of the present disclosure, the probability distribution may be considered in selecting the response representation, therefore the vocabulary related to higher probability may be selected for providing the final response.

In implementations of the present disclosure, more than one debate round may be implemented. For example, in order to determine the response representation, a third query representation may be determined based on the second query representation and at least one of the third and fourth response representations. Then the response representation may be determined based on the third query representation by at least one of the first and second agents.

Specifically, similar updating procedure may be implemented for updating the prompt embedding in the subsequent rounds. For example, when r=2, the third response representation may be determined based on a concatenation of the second response representation and at least one response representation from the debaters. With these implementations, the response representations may be updated in an easy and effective way during each round of the debate.

In implementations of the present disclosure, once the response representation is determined, the determined response representation may be converted into real answer that may be understood by human users in the natural language. Specifically, the answer to the query (which is indicated in the natural language) may be generated based on the response representation by converting the response representation into at least one vocabulary that are defined in a vocabulary table shared among the plurality of agents. Here, this converting procedure is a reverse procedure for obtaining the embedding and it may also be implemented based on the same tokenizer. With these implementations, the converting procedure may be implemented in an easy and effective way without losing useful information in the embedding space.

In implementations of the present disclosure, each response representation may comprise a plurality of vocabulary representations, for example, with a length of l, and thus a plurality of vocabularies may be generated from the plurality of vocabulary representations according to a tokenizer. Here, each vocabulary representations may be mapped into a vocabulary and thus the answer may comprise l vocabularies according to the tokenizer.

As shown in FIG. 4B, in Line 6, the Algorithm 1' enters into the post processing, where all the response representations (indicated as $embresponse_1, \ldots, embresponse_n$) may be first converted into respective responses in the natural language format. In implementations of the present disclosure, with respect to a vocabulary representation in the plurality of vocabulary representations, the procedure may be ended if it is determined that the vocabulary representation corresponds to an end vocabulary in the vocabulary table (such as an EOS token). Specifically, with respect to a certain vocabulary representation, if a distance between the certain vocabulary representation and a representation of the EOS token is within a predetermined distance, then the certain vocabulary representation may be taken as an end of the above procedure. At this point, the answer may reach an end and the response representation is converted into the natural language format.

Sometimes, the response representation may comprise lots of vocabulary representations. At this point, an upper threshold may be determined in advance for ending the above procedure. If it is determined that a size of the generated vocabularies reaches a predetermined threshold, then the answer is generated successfully and then outputted. With these implementations, the each of the plurality of response representations outputted by the plurality of agents may be converted into the natural language format.

Still referring to Line 6 of FIG. 4B, a plurality of responses (for example, indicated as $response_1, \ldots, response_n$) may be generated, and then a final response may be selected. In one example, any response may be selected from the respective responses, such as a randomly selected response. Alternatively and/or in addition to, the respective responses may be subjected to the "Convert-and-Aggregate" procedure to obtain a final response (indicated as response*). Here, the "Convert-and-Aggregate" procedure may be implemented according to any procedure for selecting an appropriate final response based on the plurality of response representations. Then, the final response may be outputted as the answer to the query in Line 7 of FIG. 4B. With these implementations, the final response is a debate result by considering multiple debaters' knowledges during multiple rounds of debate (including the initial round and one or more debate rounds). Therefore, the final response may have a higher accuracy level without a need to optimizing parameters of the multiple debaters.

Although the above paragraphs describe two debaters (i.e., the first and second agents), alternatively and/or in addition, more agents may join the debate. For example, determining a fifth response representation may be determined by a third agent in the plurality of agents based on the first query representation, the fifth response representation being convertible to an answer to the question in the natural language. At this point, in the debate rounds, the second query representation may be determined based on the first query representation and at least one of the first, second, and fifth response representations. For example, the first query representation, the first, second, and fifth response representations may be concatenated to form the second query representation. With these implementations, the query representation used in the debate rounds may carry more knowledges from more agents, and thus increase the accuracy of the final response.

In implementations of the present disclosure, all or a portion of the plurality of the agents may join the subsequent debate rounds. Specifically, in order to determine the response representation, the response representation based on the second query representation by at least one of the first, second, and third agents. With these implementations, more agents may join the debate and thus provide more knowledges to answer the question.

To show the efficacy of the multiagent debate over embeddings as discussed above, various open-source models are tested across multiple reasoning tasks. Experiments shows that the proposed solution is benchmarked against the following three baselines, which are (i) Single Answer: one language model gives a single direct response to the question in natural language, (ii) Self-Consistency: one language model independently generates multiple responses to each question, then majority voting is applied to determine the final answer, and (iii) Natural Language Debate: each agent first gives an initial response to the question. Subsequently, the models use each other's answers to refine their initial responses. After the final round of the debate, the final answer is selected from the model with the lower temperature.

The natural language debate baseline is the most direct point of comparison to the proposed solution herein since it mirrors the debate except for its natural language communication protocol. Most of the experiments are conducted on LLaMA2-70B, which is currently the largest open-source model available that also supports a long context window of up to 4k tokens. The proposed solution is also experimented on other models such as LLaMA-65B, Falcon-40B, MPT-30B, and WizardMath-70B-V1.0, to ensure the robustness and generalizability of the proposed solution.

FIG. 5 illustrates experiment results 500 with respect to the proposed solution in accordance with some example implementations of the present disclosure. In FIG. 5, a table 510 shows the accuracy level in percentage of debates between two identical LLaMA family models operating at different temperatures. Both Self-consistency (Major@5) and Natural Language Debate improve the performance over directly generating a single response (Single Answer). CIPHER Debate further increases this gap, consistently better than Natural Language Debate.

Regarding prompts, in the experiments, few-shot examples are used in conjunction with chain-of-thought prompting and zero-shot instruction to encourage the agents to generate not only the final answer but also the reasoning steps leading up to it. This helps to improve the response accuracy and also provide important information for other language models throughout the debate. For each open-source language model, only the prompts are tuned until the single answer accuracy matches the number reported in the literature. It's worth noting that the proposed solution herein is orthogonal to the choice of prompting techniques. Thus, alternative prompt engineering methods may also be readily employed on top of CIPHER.

Regarding the datasets for experiments, CIPHER is evaluated on 6 reasoning datasets that span across 4 different domains: (i) GSM8K: the evaluation is conducted on 200 questions that are randomly sampled out of approximately 1K of its test set, (ii) MMLU: three datasets are selected from three different categories to evaluate the proposed method herein. In specific, Formal Logic dataset is selected from Humanities category, High School Math dataset from STEM category, and Professional Psychology dataset from Social Science category, (iii) Arithmetic: the models are evaluated on 200 mathematical expressions comprising six unique two-digit numbers that includes addition, multiplication, and subtraction operations, and (iv) Biographies: factuality is evaluated by requiring the model to generate biographies of famous computer scientists.

For debates among identical language models operating at different temperatures, the efficacy of the debates is assessed based on the correctness of the final round responses generated by the language model with the lowest temperature. For CIPHER debaters, their final embedding responses are converted back to natural language using nearest neighbor search for evaluation purposes. To evaluate the efficacy of debates among different language models that share a same tokenizer, the correctness of all the final-round answers is tested.

In what follows, the performance of CIPHER debates is assessed against the baselines in 3-round debate between two language models. The number of debate rounds and participants are based on the observation from some previous works.

A comprehensive evaluation of CIPHER debate is conducted using LLaMA family of language models (LLaMA-65B and LLaMA2-70B) over 6 reasoning datasets. The table 510 presents the results from debates between two identical LLaMA family language models operating at different temperatures. It is noted that the evaluations of debates are based on the final responses of the agent with the lowest temperature, yielding a total of 5 responses per debate. For fair comparisons, the self-consistency baselines (labeled as Major@5) also utilize 5 responses.

Tables 510 and 520 in FIG. 5 present the results of debates between LLaMA-65B and LLaMA2-70B on the Arithmetic and GSM8K datasets, respectively. The table 510 shows debates between LLaMA2-70B and LLaMA-65B on Arithmetic dataset. The proportions of the changes in responses compared to the previous round in the brackets are reported. Table 3 shows debates between LLaMA2-70B and LLaMA-65B on GSM8K dataset. The proportions of the changes in responses compared to the previous round in the brackets are also reported.

When facilitating CIPHER debates between LLaMA-65B and LLaMA2-70B, even though both models utilize the same tokenizer, they possess distinct vocabulary-embedding mappings. This issue may be addressed by maintaining a bijection mapping between the vocabulary embeddings of the two models. While debating proves beneficial for both agents, LLaMA-65B experiences a substantial improvement, increasing its accuracy from 35% to 60.5%. It is also observed that the less powerful agents tend to refine their responses more during debates.

While recent works have shown the phenomenon of rapidly diminishing marginal return of scaling up the numbers of debaters and rounds, nonetheless these scenarios are included for the sake of a comprehensive evaluation. This allows to present a more complete picture of the performance landscape of CIPHER debate.

Regarding temperature sensitivity, in natural language debates, optimal performance is often achieved when all debaters are set to low temperatures. This may be attributed to the inherent information loss during the token sampling procedure in natural language generation. At higher temperatures, language models are prone to generating nonsensical or misleading responses, which may even undermine the performance of the stronger debaters. In contrast, for CIPHER debates, optimal performance is often obtained when the debaters are set to wider spread apart temperatures. This is likely because CIPHER retains the language models' beliefs across the entire vocabulary set. At higher temperatures, the information in CIPHER embeddings lean towards the less confident vocabulary choices, effectively complementing the information communicated the other CIPHER debaters operating at lower temperatures. It is also worth noting that, for the purpose of converting the final response of back into readable natural language by nearest neighbor search, having at least one CIPHER debater set at a low temperature is necessary.

The issue of positional bias in utilizing language models as evaluators has attracted increasing attention in recent studies. Although the proposed multiagent debate setting differs from "language models as evaluators", it is recognized that the sequence in which prior rounds responses are fed into subsequent rounds of debates could still have non-negligible effects on the outcomes of the debates.

To elucidate the mechanisms contributing to the performance gain brought by CIPHER, an ablation study is conducted with partial CIPHER response generation. In specific, the CIPHER response generation is invoked only at the positions where the model exhibits high uncertainty regarding the next token. To quantify the uncertainty at a given position l, Shannon entropy $$H\left(p^{(l)}\right) = -\sum_{i=1}^{V} p_i^{(l)} \log p_i^{(l)}$$

of the generation distribution $p^{(l)}$ is employed over the vocabulary set. A threshold is set as $\varepsilon > 0$ and natural language token sampling is adopted whenever $H(p^{(l)}) < \varepsilon$ while switching to CIPHER response generation when the entropy exceeds this threshold otherwise. Such a targeted application of CIPHER serves to shed light on the importance of information preservation during moments of model uncertainty.

While prior research showcases significant performance enhancements achieved through language model debates. Yet, the limit of such a performance gain remains a captivating facet of study. To investigate the performance upper bound that may be achieved through multiagent debate, experiments are conducted where the language model debater is pitted against an expert debater. The expert debater is proxied by having it always give the ground truth answers. Conversely, to establish the performance lower bound, an experiment is conducted where the model debater constantly receives nonsensical feedback from other debaters. Specifically, 2 dummy debaters are employed, one with extremely high temperature that gives non-sense, and the other gives non-relevant responses by using misaligned ground truth answer from other questions in the batch. It has been illustrated that debating may be detrimental when the model has low capacity, but it does not pose much harm in case of a more powerful model.

In implementations of the present disclosure, the proposed CIPHER debate demonstrates promising results across various reasoning tasks. Without necessitating special training, CIPHER enhances the debate efficacy of smaller open-source language models, outperforming both the majority voting and natural language debates. The disclosure not only underscores the vast potential of language models' belief information but also serves as a first step towards fully unlocking such potential in language model debates. It remains intriguing whether there is an even more efficient way of transferring belief information among language models, given the fact that language models are only trained to intake the embeddings of natural language text tokens.

The CIPHER's applicability depends on language models that has a shared vocabulary set. Extending the proposed solution to language models with distinct tokenizers demands meticulous alignment across their respective embedding-vocabulary mappings. Such an alignment is challenging due to tokenizers often adopting vastly dissimilar text segmentation strategies. For instance, while one token might break a word into sub-words or characters, another might recognize it as a whole token. Overcoming this bottleneck could pave the way for constructing even more robust and efficient language model agent systems, potentially unleashing unprecedented collaborative capabilities across diverse language models.

In some implementations of the present disclosure, a novel communication protocol is introduced for models that share the same tokenizer, regardless of whether they use identical or different embedding-vocabulary mappings.

In some implementations of the present disclosure, comprehensive experiments involving multiple open-source models across five different datasets have been performed to validate the efficacy of the proposed communication protocol herein. The experiment results show that even less powerful models may still benefit from debates.

In some implementations of the present disclosure, an extensive ablation study is conducted to shed lights on the mechanisms that make communication in embeddings more effective for debate among models.

FIG. 6 illustrates a flowchart of a method 600 for multi-agent debate in accordance with some example implementations of the present disclosure. The method 600 may be implemented at the conversational platform 110 as illustrated in FIG. 1. At a block 610, a first and a second response representation are determined by a first and a second agent in a plurality of agents based on a first query representation for a query in a natural language, respectively, here the first and second response representations are convertible to a first and a second answer to the query in the natural language, respectively. At a block 620, a second query representation is obtained based on the first query representation, and at least one of the first and second response representations. At a block 630, a response representation is determined based on the second query representation by at least one of the first and second agents, here the response representation is convertible to an answer to the query in the natural language.

In some implementations of the present disclosure, determining the response representation comprises: determining a third response representation by the first agent based on the second query representation, and determining a fourth response representation by the second agent based on the second query representation, the third and fourth response representations being convertible to an answer to the query in the natural language; and selecting, from the third and fourth response representations, the response representation for generating an answer to the query in the natural language.

In some implementations of the present disclosure, determining the response representation further comprises: obtaining a third query representation based on the second query representation, and at least one of the third and fourth response representations; and determining the response representation based on the third query representation by at least one of the first and second agents.

In some implementations of the present disclosure, selecting the response representation comprises: selecting the response representation from the third and fourth response representations based on respective distributions related to respective vocabularies that are determined according to the third and fourth response representations, the respective vocabularies are included in a vocabulary table shared among the plurality of agents.

In some implementations of the present disclosure, the answer comprises a previous portion including at least one vocabulary and a current vocabulary that follows the previous portion, the at least one vocabulary and the current vocabulary are included in a vocabulary table shared among the plurality of agents, and determining the first response representation by the first agent based on the first query representation comprises: obtaining, based on the first query representation and a previous representation for the previous portion, a current representation for the current vocabulary by the first agent; and determining the first response representation based on the previous representation and the current representation.

In some implementations of the present disclosure, obtaining the current representation comprises: determining a distribution related to a plurality of vocabulary representations respectively corresponding to a plurality of vocabularies that are defined in a vocabulary table shared among the plurality of agents; and determining the current representation by weighting the plurality of vocabulary representations according to the distribution.

In some implementations of the present disclosure, the method 600 further comprising: generating the answer to the query in the natural language based on the response representation by converting the response representation into at least one vocabulary that are defined in a vocabulary table shared among the plurality of agents.

In some implementations of the present disclosure, the response representation comprises a plurality of vocabulary representations, and generating the answer comprises: generating a plurality of vocabularies based on the plurality of vocabulary representations according to a tokenizer, the tokenizer being shared among the plurality of agents and describing an association relationship between a vocabulary in a plurality of vocabularies that are defined in the vocabulary table and a vocabulary representation for the vocabulary.

In some implementations of the present disclosure, with respect to a vocabulary representation in the plurality of vocabulary representations, the generating is ended in response to any of: a determination that the vocabulary representation corresponds to an end vocabulary in the vocabulary table; or a determination that a size of the generated vocabularies reaches a predetermined threshold.

In some implementations of the present disclosure, obtaining the second query representation comprising: combining the first query representation, and at least one of the first and second response representations.

In some implementations of the present disclosure, the method 600 further comprising: determining a fifth response representation by a third agent in the plurality of agents based on the first query representation, the fifth response representation being convertible to an answer to the question in the natural language; and wherein obtaining the second query representation further comprises: determining the second query representation based on the first query representation, and at least one of the first, second, and fifth response representations.

In some implementations of the present disclosure, determining the response representation further comprises: determining the response representation based on the second query representation by at least one of the first, second, and third agents.

In some implementations of the present disclosure, there is provided an electronic device, comprising a computer processor coupled to a computer-readable memory unit, the memory unit comprising instructions that when executed by the computer processor implements a method for multiagent debate. The method comprises: determining a first and a second response representation by a first and a second agent in a plurality of agents based on a first query representation for a query in a natural language, respectively, the first and second response representations being convertible to a first and a second answer to the query in the natural language, respectively; obtaining a second query representation based on the first query representation, and at least one of the first and second response representations; and determining a response representation based on the second query representation by at least one of the first and second agents, the response representation being convertible to an answer to the query in the natural language.

In some implementations of the present disclosure, determining the response representation comprises: determining a third response representation by the first agent based on the second query representation, and determining a fourth response representation by the second agent based on the second query representation, the third and fourth response representations being convertible to an answer to the query in the natural language; and selecting, from the third and fourth response representations, the response representation for generating an answer to the query in the natural language.

In some implementations of the present disclosure, determining the response representation further comprises: obtaining a third query representation based on the second query representation, and at least one of the third and fourth response representations; and determining the response representation based on the third query representation by at least one of the first and second agents.

In some implementations of the present disclosure, selecting the response representation comprises: selecting the response representation from the third and fourth response representations based on respective distributions related to respective vocabularies that are determined according to the third and fourth response representations, the respective vocabularies are included in a vocabulary table shared among the plurality of agents.

In some implementations of the present disclosure, the answer comprises a previous portion including at least one vocabulary and a current vocabulary that follows the previous portion, the at least one vocabulary and the current vocabulary are included in a vocabulary table shared among the plurality of agents, and determining the first response representation by the first agent based on the first query representation comprises: obtaining, based on the first query representation and a previous representation for the previous portion, a current representation for the current vocabulary by the first agent; and determining the first response representation based on the previous representation and the current representation.

In some implementations of the present disclosure, obtaining the current representation comprises: determining a distribution related to a plurality of vocabulary representations respectively corresponding to a plurality of vocabularies that are defined in a vocabulary table shared among the plurality of agents; and determining the current representation by weighting the plurality of vocabulary representations according to the distribution.

In some implementations of the present disclosure, the method 600 further comprising: generating the answer to the query in the natural language based on the response representation by converting the response representation into at least one vocabulary that are defined in a vocabulary table shared among the plurality of agents.

In some implementations of the present disclosure, the response representation comprises a plurality of vocabulary representations, and generating the answer comprises: generating a plurality of vocabularies based on the plurality of vocabulary representations according to a tokenizer, the tokenizer being shared among the plurality of agents and describing an association relationship between a vocabulary in a plurality of vocabularies that are defined in the vocabulary table and a vocabulary representation for the vocabulary.

In some implementations of the present disclosure, with respect to a vocabulary representation in the plurality of vocabulary representations, the generating is ended in response to any of: a determination that the vocabulary representation corresponds to an end vocabulary in the vocabulary table; or a determination that a size of the generated vocabularies reaches a predetermined threshold.

In some implementations of the present disclosure, obtaining the second query representation comprising: combining the first query representation, and at least one of the first and second response representations.

In some implementations of the present disclosure, the method 600 further comprising: determining a fifth response representation by a third agent in the plurality of agents based on the first query representation, the fifth response representation being convertible to an answer to the question in the natural language; and wherein obtaining the second query representation further comprises: determining the second query representation based on the first query representation, and at least one of the first, second, and fifth response representations.

In some implementations of the present disclosure, determining the response representation further comprises: determining the response representation based on the second query representation by at least one of the first, second, and third agents.

In some implementations of the present disclosure, there is provided a non-transitory computer program product, the non-transitory computer program product comprising a computer readable storage medium having program instructions embodied therewith, the program instructions executable by an electronic device to cause the electronic device to perform a method for multiagent debate. The method comprising: determining a first and a second response representation by a first and a second agent in a plurality of agents based on a first query representation for a query in a natural language, respectively, the first and second response representations being convertible to a first and a second answer to the query in the natural language, respectively; obtaining a second query representation based on the first query representation, and at least one of the first and second response representations; and determining a response representation based on the second query representation by at least one of the first and second agents, the response representation being convertible to an answer to the query in the natural language. In some implementations of the present disclosure, the method further comprises other steps as described in the present disclosure.

Figure 7:
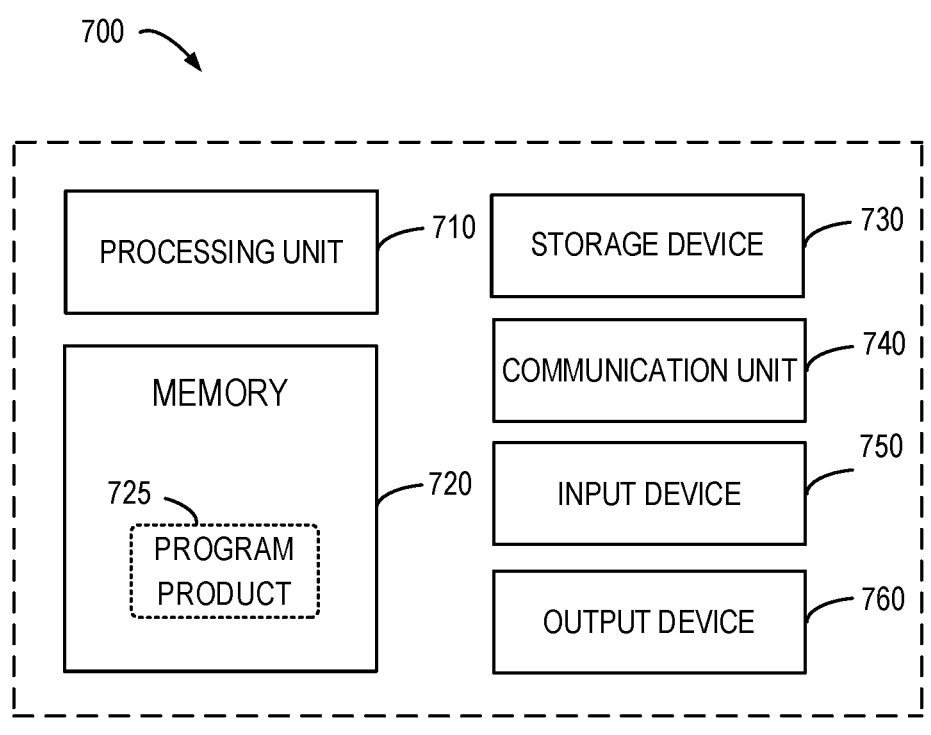
FIG. 7 illustrates a block diagram of a computing device/server in which one or more implementations of the present disclosure may be implemented.

FIG. 7 illustrates a block diagram of a computing device/server 700 in which one or more implementations of the present disclosure may be implemented. It should be understood that the computing device/server 700 shown in FIG. 7 is only an example and should not suggest any limitation on the functionality and scope of the implementations described herein.

As shown in FIG. 7, the computing device/server 700 is in the form of a general computing device. The components of computing device/server 700 may include, but are not limited to, one or more processors or processing units 710, a memory 720, a storage device 730, one or more communication units 740, one or more input devices 750, and one or more output devices 760. The processing unit 710 may be an actual or virtual processor and may execute various processes based on the programs stored in the memory 720. In a multiprocessor system, multiple processing units execute computer executable instructions in parallel to improve the parallel processing capability of the computing device/server 700.

The computing device/server 700 typically includes multiple computer storage medium. Such medium may be any available medium that is accessible to the computing device/server 700, including but not limited to volatile and non-volatile medium, removable and non-removable medium. The memory 720 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 730 may be any removable or non-removable medium, and may include a machine readable medium such as a flash drive, a disk, or any other medium, which may be used to store information and/or data (such as training data for training) and may be accessed within the computing device/server 700.

The computing device/system 700 may further include additional removable/non-removable, volatile/non-volatile storage medium. Although not shown in FIG. 7, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 720 may include a computer program product 725, which has one or more program modules configured to perform various methods or acts of various implementations of the present disclosure.

The communication unit 740 communicates with a further computing device through the communication medium. In addition, functions of components in the computing device/system 700 may be implemented by a single computing cluster or multiple computing machines, which may communicate through a communication connection. Therefore, the computing device/system 700 may be operated in a networking environment using a logical connection with one or more other servers, a network personal computer (PC), or another network node.

The input device 750 may be one or more input devices, such as a mouse, a keyboard, a trackball, etc. The output device 760 may be one or more output devices, such as a display, a speaker, a printer, etc. The computing device/system 700 may also communicate with one or more external devices (not shown) through the communication unit 740 as required. The external device, such as a storage device, a display device, etc., communicate with one or more devices that enable users to interact with the computing device/system 700, or communicate with any device (for example, a network card, a modem, etc.) that makes the computing device/system 700 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes may also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

What is claimed is:

1. A computer-implemented method for replying to a user query based on multiagent debate, comprising:

receiving, by a computing device and from a user device, a query in a natural language;

transmitting, by the computing device, a first query representation for the query to a first and a second agent in a plurality of agents, the first query representation being in an embedding space of a tokenizer that is shared among the plurality of agents;

receiving, by the computing device, a first and a second response representation determined by the first and the second agents in the plurality of agents based on the first query representation for the query in the natural language, respectively, the first and second response representations being in the embedding space and being convertible to a first and a second answer to the query in the natural language, respectively;

obtaining, by the computing device, a second query representation based on the first query representation, and at least one of the first and second response representations, the second query representation being in the embedding space;

transmitting, by the computing device, the second query representation to the first and second agents;

receiving, by the computing device, a response representation determined based on the second query representation by at least one of the first and second agents, the response representation being in the embedding space and being convertible to an answer to the query in the natural language; and converting, by the computing device, the response representation from the embedding space of the tokenizer into the answer in the natural language and providing the answer to the user device.

2. The method of claim 1, wherein determining the response representation comprises:

determining a third response representation by the first agent based on the second query representation, and determining a fourth response representation by the second agent based on the second query representation, the third and fourth response representations being convertible to an answer to the query in the natural language; and selecting, from the third and fourth response representations, the response representation for generating an answer to the query in the natural language.

3. The method of claim 2, wherein determining the response representation further comprises:

obtaining a third query representation based on the second query representation, and at least one of the third and fourth response representations; and determining the response representation based on the third query representation by at least one of the first and second agents.

4. The method of claim 2, wherein selecting the response representation comprises: selecting the response representation from the third and fourth response representations based on respective distributions related to respective vocabularies that are determined according to the third and fourth response representations, the respective vocabularies are included in a vocabulary table shared among the plurality of agents.

5. The method of claim 1, wherein the answer comprises a previous portion including at least one vocabulary and a current vocabulary that follows the previous portion, the at least one vocabulary and the current vocabulary are included in a vocabulary table shared among the plurality of agents, and determining the first response representation by the first agent based on the first query representation comprises:

obtaining, based on the first query representation and a previous representation for the previous portion, a current representation for the current vocabulary by the first agent; and determining the first response representation based on the previous representation and the current representation.

6. The method of claim 5, wherein obtaining the current representation comprises:

determining a distribution related to a plurality of vocabulary representations respectively corresponding to a plurality of vocabularies that are defined in a vocabulary table shared among the plurality of agents; and determining the current representation by weighting the plurality of vocabulary representations according to the distribution.

7. The method of claim 1, further comprising: generating the answer to the query in the natural language based on the response representation by converting the response representation into at least one vocabulary that are defined in a vocabulary table shared among the plurality of agents.

8. The method of claim 7, wherein the response representation comprises a plurality of vocabulary representations, and generating the answer comprises: generating a plurality of vocabularies based on the plurality of vocabulary representations according to a tokenizer, the tokenizer describing an association relationship between a vocabulary in a plurality of vocabularies that are defined in the vocabulary table and a vocabulary representation for the vocabulary.

9. The method of claim 8, wherein with respect to a vocabulary representation in the plurality of vocabulary representations, the generating is ended in response to any of:

a determination that the vocabulary representation corresponds to an end vocabulary in the vocabulary table; or a determination that a size of the generated vocabularies reaches a predetermined threshold.

10. The method of claim 1, wherein obtaining the second query representation comprising: combining the first query representation, and at least one of the first and second response representations.

11. The method of claim 1, further comprising: determining a fifth response representation by a third agent in the plurality of agents based on the first query representation, the fifth response representation being convertible to an answer to the question in the natural language; and wherein obtaining the second query representation further comprises: determining the second query representation based on the first query representation, and at least one of the first, second, and fifth response representations.

12. The method of claim 11, wherein determining the response representation further comprises: determining the response representation based on the second query representation by at least one of the first, second, and third agents.

13. An electronic device, comprising a computer processor coupled to a computer-readable memory unit, the memory unit comprising instructions that when executed by the computer processor implements a method for replying to a user query based on multiagent debate, the method comprising:

receiving by a computing device and from a user device, a query in a natural language;

transmitting, by the computing device, a first query representation for the query to a first and a second agent in a plurality of agents, the first query representation being in an embedding space of a tokenizer that is shared among the plurality of agents;

receiving, by the computing device, a first and a second response representation determined by the first and the second agents in the plurality of agents based on the first query representation for the query in the natural language, respectively, the first and second response representations being in the embedding space and being convertible to a first and a second answer to the query in the natural language, respectively;

obtaining, by the computing device, a second query representation based on the first query representation, and at least one of the first and second response representations, the second query representation being in the embedding space;

transmitting, by the computing device, the second query representation to the first and second agents:

receiving, by the computing device, a response representation determined based on the second query representation by at least one of the first and second agents, the response representation being in the embedding space and being convertible to an answer to the query in the natural language; and converting, by the computing device, the response representation from the embedding space of the tokenizer into the answer in the natural language and providing the answer to the user device.

14. The device of claim 13, wherein determining the response representation comprises:

determining a third response representation by the first agent based on the second query representation, and determining a fourth response representation by the second agent based on the second query representation, the third and fourth response representations being convertible to an answer to the query in the natural language; and selecting, from the third and fourth response representations, the response representation for generating an answer to the query in the natural language.

15. The device of claim 14, wherein determining the response representation further comprises:

obtaining a third query representation based on the second query representation, and at least one of the third and fourth response representations; and determining the response representation based on the third query representation by at least one of the first and second agents.

16. The device of claim 14, wherein selecting the response representation comprises: selecting the response representation from the third and fourth response representations based on respective distributions related to respective vocabularies that are determined according to the third and fourth response representations, the respective vocabularies are included in a vocabulary table shared among the plurality of agents.

17. The device of claim 13, wherein the answer comprises a previous portion including at least one vocabulary and a current vocabulary that follows the previous portion, the at least one vocabulary and the current vocabulary are included in a vocabulary table shared among the plurality of agents, and determining the first response representation by the first agent based on the first query representation comprises:

obtaining, based on the first query representation and a previous representation for the previous portion, a current representation for the current vocabulary by the first agent; and determining the first response representation based on the previous representation and the current representation.

18. The device of claim 17, wherein obtaining the current representation comprises:

determining a distribution related to a plurality of vocabulary representations respectively corresponding to a plurality of vocabularies that are defined in a vocabulary table shared among the plurality of agents; and determining the current representation by weighting the plurality of vocabulary representations according to the distribution.

19. The device of claim 13, further comprising: generating the answer to the query in the natural language based on the response representation by converting the response representation into at least one vocabulary that are defined in a vocabulary table shared among the plurality of agents.

20. A non-transitory computer program product, the non-transitory computer program product comprising a computer readable storage medium having program instructions embodied therewith, the program instructions executable by an electronic device to cause the electronic device to perform a method for replying to a user query based on multiagent debate, the method comprising:

receiving, by a computing device and from a user device, a query in a natural language;

transmitting, by the computing device, a first query representation for the query to a first and a second agent in a plurality of agents, the first query representation being in an embedding space of a tokenizer that is shared among the plurality of agents;

receiving, by the computing device, a first and a second response representation determined by the first and the second agents in the plurality of agents based on the first query representation for the query in the natural language, respectively, the first and second response representations being in the embedding space and being convertible to a first and a second answer to the query in the natural language, respectively;

obtaining, by the computing device, a second query representation based on the first query representation, and at least one of the first and second response representations, the second query representation being in the embedding space;

transmitting, by the computing device, the second query representation to the first and second agents;

receiving, by the computing device, a response representation determined based on the second query representation by at least one of the first and second agents, the response representation being in the embedding space and being convertible to an answer to the query in the natural language; and converting, by the computing device, the response representation from the embedding space of the tokenizer into the answer in the natural language and providing the answer to the user device.

* * * * *